United States Patent [19]

Ishikawa

[11] Patent Number: 5,021,651
[45] Date of Patent: Jun. 4, 1991

[54] MOUNTING FOR A BALL LENS ON A BAR CODE READER WAND HAVING A TAPERED LENS BORE

[75] Inventor: Hiroshi Ishikawa, Furukawa, Japan
[73] Assignee: Alps Electric Co., Ltd., Tokyo, Japan
[21] Appl. No.: 473,074
[22] Filed: Jan. 31, 1990
[30] Foreign Application Priority Data
  May 22, 1989 [JP] Japan .............................. 1-58092[U]
[51] Int. Cl.5 .............................................. H01J 5/02
[52] U.S. Cl. .................................... 250/239; 250/216; 350/252; 235/473
[58] Field of Search .................... 250/227.13, 239, 216, 250/566, 569, 568; 235/472, 462, 473; 350/252, 253, 235

[56] References Cited

U.S. PATENT DOCUMENTS 3,904,277  9/1975  Phillips et al. ....................... 235/472
3,911,270 10/1975  Traub ................................... 250/216
4,855,582  8/1989  Bayley ................................. 235/472

Primary Examiner—David C. Nelms
Assistant Examiner—Stephone B. Allen
Attorney, Agent, or Firm—Guy W. Shoup; Norman R. Klivans

[57] ABSTRACT

In an optical reader a lens is mounted in and held in a mounting recess at a portion of the tip of a casing accommodating a light emitting element and a light receiving element, the recess continuing from a tapered bore through which light from the light emitting element passes. The casing is formed by resin molding, and the mounting recess has a flat bottom surface. Therefore, the apparatus can be manufactured at low cost while preventing the lens from becoming damaged during its press fitting into the recess, and also enabling the lens to be securely held therein.

4 Claims, 2 Drawing Sheets

MOUNTING FOR A BALL LENS ON A BAR CODE READER WAND HAVING A TAPERED LENS BORE

BACKGROUND OF THE INVENTION

The present invention relates to optical readers such as a bar-code scanner and an image scanners.

Optical readers of the above-mentioned type have the following construction. For instance, in the case of a barcode scanner, it includes a main body of a casing which accommodates various members such as a light emitting element, a light receiving element, optical fibers serving as a light channeling means, and an electrical processing circuit. The forward end of the main body of the casing is closed by a metal cylindrical cap. A light passage hole is formed in the metal cap, and a ball lens is fitted in the hole.

With this construction, when a beam is emitted from the light emitting element, it transmits through the ball lens to be projected onto a bar code to be read. The beam reflected by the bar code transmits through the ball lens to be received by the light receiving element. The light receiving element generates a signal which is then analyzed by the electrical processing circuit. The bar code is read in this manner.

During the manufacture of such a conventional optical reader, a ball lens is inserted into a light passage hole already formed in a metal cap by grinding. While the inserted ball lens is spinning, a tip portion of the cap is caulked so that the ball lens fits into the hole of the cap and held therein. This caulking process, however, involves a risk that the ball lens may be broken. In such cases, high cost is inevitably incurred in the production of the cap assembly.

In order to avoid this risk, proposals have been made for resin molding of caps.

One of such proposals will be described with reference to FIG. 2 showing the cap portion of a conventional optical reader. A cap 6 is formed by a resin molding method employing a first mold part 3 having a body portion 1 formed as a part of a sphere and a cylinder portion 2 formed integrally at an end of the body portion 1, as well as a second mold part 3 having a tip formed as a tapering portion 4. Although not shown, besides the first and second mold parts 3 and 5, another mold part is used to shape the outer surface of the cap 6.

When the cap 6 is formed in this way, a mounting recess 7 having a spherical inner surface and a bore 8 continuing from the recess 7 are formed in their respective portions of the tip of the cap 6. In order to allow the formation of a suitable draft angle, the bore 8 has a configuration in which its inner diameter increases from its inward end toward its outward end.

After the cap 6 has been formed, it is mounted on a main body 9 of the casing, indicated by one-dot-chain lines in FIG. 2, in such a manner that the cap 6 closes an opening 10 at the forward end of the main body 9. Subsequently, while the cap 6 is slightly deformed, a ball lens 11 is fitted into the mounting recess 7, thereby completing the assembly of the optical reader. Thus, when a cap 6 is formed by the proposed resin molding method, it is possible to prevent the risk of the ball lens 11 being damaged during assembly.

However, the above-described proposal entails the following drawback. Since the first mold part 3, which is used to form the bore 8 as well as the mounting recess 7 for fitting therein the ball lens 11, must have the spherical body portion 1 and the cylinder portion 2 integral at one end thereof, the first mold part 3 can be machined only with difficulty. This makes the preparation of the entire mold expensive. Thus, the proposal fails to manufacture a cap assembly without incurring high production cost.

SUMMARY OF THE INVENTION

The present invention is intended, in view of the problems of the prior art, to overcome these problems.

An object of the present invention is to provide an optical reader which can be manufactured at low cost, and which has a cap allowing a lens to be fitted without becoming damaged.

In order to achieve the above-stated object, according to the present invention, an optical reader comprises: a casing; a light emitting element and a light receiving element accommodated within the casing; a bore formed at a portion of the tip of the casing, the bore allowing the passage therethrough of light from the light emitting element; a mounting recess formed at a portion of the tip of the casing in such a manner as to continue from the bore; and a lens mounted in and held in the mounting recess. The casing is resin molded, and the mounting recess has a flat bottom surface.

The optical reader according to the present invention provides the following advantages. Since the casing is formed by resin molding, and the mounting recess formed in the tip of the casing has a flat bottom surface, the lens can be press fitted into the mounting recess with ease. When the lens is press fitted, it is positioned on the flat bottom surface, and is securely mounted on the casing.

Since the casing is formed of a resin material, it allows the lens to be assembled thereon without becoming damaged. Further, mold parts for forming the casing can be prepared by simple machining. Therefore, the optical reader can be manufactured at low production cost.

DESCRIPTION OF THE PREFERRED EMBODIMENT

An embodiment of the present invention will now be described with reference to FIG. 1.

Figure 1:
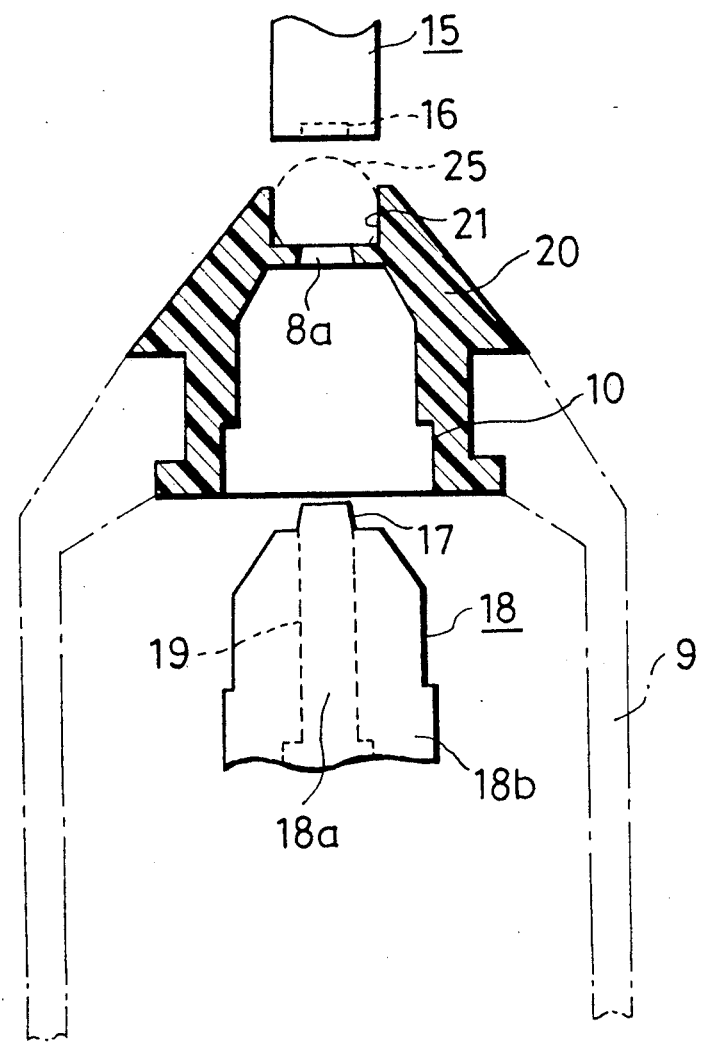
FIG. 1 is a fragmentary view of an embodiment of the present invention, showing a cap portion of the embodiment together with mold parts.
Figure 2:
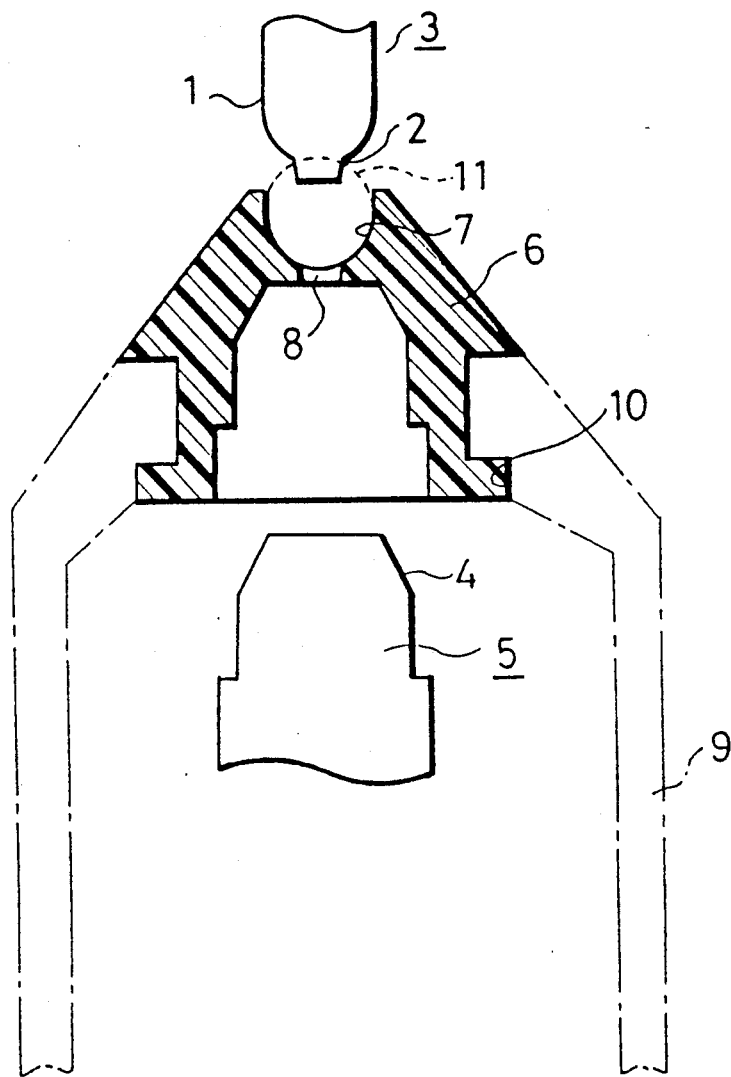
FIG. 2 is a fragmentary view of an optical reader already proposed, showing a cap portion of the apparatus together with mold parts.

As shown in FIG. 1, an optical reader according to the present invention includes a casing having a main body 9 and a cap 20. The cap 20 has a mounting recess 21 and a bore 8a formed therein. The mounting recess 21 has a flat bottom surface. The bore 8a continues from the mounting recess 21, and the inner diameter of the bore 8a increases from its outward end toward its inward end. A lens 25 has a substantially semi-spherical configuration with a flat bottom, and it is fitted in and held in the mounting recess 21 with its flat bottom surface kept in contact with the bottom surface of the recess 21.

During assembly of the optical reader, a cap assembly formed by the cap 20 and the lens 25 already assembled thereon is mounted on the main body 9 of the casing in such a manner that the assembly closes an opening 10 at the forward end of the main body 9 indicated by one-dot-chain lines in FIG. 1. The main body 9 already accommodates an light emitting element, a light receiving element, optical fibers, and an electrical processing circuit, none of which are shown. When the apparatus is in use, a beam emitted from the light emitting element is projected onto a bar code to be read, the reflected beam is received by the light receiving element, and a signal resulting from the reception of the beam is analyzed and processed by the electrical processing circuit, so as to read the bar code.

The method by which the cap 20 of the apparatus is formed will be described.

As shown in FIG. 1, the cap 20 is formed by resin molding which employs a resin material, e.g., an ABS resin material, and a mold having a first mold part 15 and a second mold part 18. The first mold part 15 has a cylindrical configuration. A cylinder recess 16 is formed in the bottom surface of the mold part 15, and the inner diameter of the cylinder recess 16 decreases upwardly, as viewed in FIG. 1. The second mold part 18 has a substantially cylindrical configuration with a tapering upper portion, and the mold part 18 includes an axial body 18a fitted into and held in a through hole 19 formed in a main body 18b. A portion of the axial body 18a projects from the upper surface of the main body 18b to form a cylinder projection 17 whose outer diameter decreases upwardly.

The resin molding is effected in the following manner. Within an outer-frame mold part, not shown, the second mold part 18 having the above-described cylinder projection 17 at its forward end is brought into contact with the first mold part 15 until the projection 17 is received in the cylinder recess 16. Thereafter, a molten resin is charged into the cavity defined in the mold, and it is then set. When this is completed, a cap 20 is formed by resin molding.

Specifically, in the tip of the thus formed cap 20, a mounting recess 21 having a flat bottom surface is formed by the first mold part 15, and a bore 8a is formed by the second mold part 18. In compliance with the external configuration of the cylinder projection 17 of the second mold part 18, the inner diameter of the bore 8a increases toward its side which is to face the inside of the main body 9 of the casing.

When the cap 20 has been resin molded, the first mold part 15 is separated by drawing it upward, and the second mold part 18 is easily separated by drawing it downward along the axis through the bore 8a. The outer-frame mold part is also removed.

Thereafter, the thus obtained cap 20 is subjected to an assembly operation in which a substantially semi-spherical lens 25 is mounted thereon. Before this assembly operation, in order to protect the surface of the lens 25, a coating of a suitable protective agent, such as Bando 614B (a product of Three Bond K.K.), is applied to the surface.

After the assembly, the surface of the cap 20 is made rough by a chemical etching method or the like, and electroless copper plating is effected to form a coating having a thickness of the order of 0.1 to 0.3 mm. Thereafter, electroplating of nickel and, subsequently, chromium is effected to form a metal plating. Thereafter, the protective agent coated on the lens 25 is removed so as to remove any plating on the lens 25.

According to the foregoing embodiment, since the cap 20 is formed of a resin material, the cap 20 allows the lens 25 to be fitted into the mounting recess 21 without becoming damaged. Since the bottom surface of the recess 21 is flat, the substantially semi-spherical lens 25 can be securely fitted in and held in the recess 21.

Since the first mold part 15 used in the formation of the cap 20 has a simple configuration, the mold can be manufactured at low cost, thereby greatly reducing the entire production cost.

The metal plating increases the level of strength with which the lens 25 is mounted, while increasing the impact resistance of the entire cap assembly.

The lens 25 is securely mounted in the mounting recess 21 with respective flat surfaces kept in mutual contact. This makes it possible to avoid any variation in the condition in which light is converged by the lens 25, hence, to enable stable reading.

In the foregoing embodiment, although a substantially semi-spherical lens is used, this is a mere example, and the present invention is not limited thereto. Alternatively, a spherical or aspherical lens may be used. Further, although in the foregoing embodiment the casing has a cap and a main body which are separate members, the casing may alternatively be formed as an integral structure.

As has been described above in detail, the optical reader according to the present invention can be manufactured at low cost, without involving the risk of the lens being damaged during its assembly onto the cap. The apparatus is also advantageous in that it can be manufactured at high yield.

What is claimed is:

1. An optical reader comprising:
    a casing;
    a light emitting element and a light receiving element accommodated within said casing;
    a bore formed at a portion of the tip of said casing, said bore allowing the passage therethrough of light from said light emitting element;
    a mounting recess formed at a portion of the tip of said casing in communication with said bore; and
    a lens mounted in said mounting recess, wherein said mounting recess has a flat bottom surface, and said bore being tapered so as to be smaller in diameter at a portion thereof at said mounting recess than at any other portion thereof.

2. The reader of claim 1, wherein said lens is semi-spherical in shape with a flat surface thereof in contact with said flat bottom surface.

3. The reader of claim 1, wherein said casing comprises:
    a cap for holding said lens; and
    a casing main body connected to said cap.

4. The reader of claim 1, wherein said bore is circular in cross section.

* * * * *